(12) United States Patent
Bae et al.

(10) Patent No.: US 11,921,901 B2
(45) Date of Patent: Mar. 5, 2024

(54) DELEGATED DOCUMENT SENDING AND MANAGEMENT

(71) Applicant: DocuSign, Inc., San Francisco, CA (US)

(72) Inventors: Janice Bae, Redwood City, CA (US); Pavel Rebriy, Renton, WA (US); Matthew Ritchie, Walnut Creek, CA (US); Macklin Douglas Underdown, Detroit, MI (US)

(73) Assignee: DOCUSIGN, INC., San Francisco, CA (US)

( * ) Notice: Subject to any disclaimer, the term of this patent is extended or adjusted under 35 U.S.C. 154(b) by 234 days.

(21) Appl. No.: 17/587,983

(22) Filed: Jan. 28, 2022

(65) Prior Publication Data

US 2023/0281341 A1 Sep. 7, 2023

(51) Int. Cl.
*G06F 21/62* (2013.01)
*G06F 21/40* (2013.01)

(52) U.S. Cl.
CPC ................. *G06F 21/6272* (2013.01)

(58) Field of Classification Search
CPC .................................. G06F 21/6272
USPC ........................................... 726/28
See application file for complete search history.

(56) References Cited

U.S. PATENT DOCUMENTS

| 6,357,010 | B1* | 3/2002 | Viets | H04L 9/40 709/225 |
| 8,332,253 | B1* | 12/2012 | Farmer | G06Q 10/0633 705/7.27 |
| 8,873,095 | B2* | 10/2014 | Selvaraj | H04N 1/00225 358/1.9 |
| 9,450,958 | B1* | 9/2016 | Saylor | H04L 63/102 |
| 2007/0214243 | A1* | 9/2007 | Bao | H04L 67/54 709/220 |
| 2009/0292930 | A1* | 11/2009 | Marano | G06F 21/6218 726/28 |
| 2014/0351952 | A1* | 11/2014 | Gopu | G06F 21/105 726/27 |
| 2017/0187753 | A1* | 6/2017 | Brisebois | H04L 63/20 |
| 2018/0068010 | A1* | 3/2018 | Paterson | G06F 16/93 |

* cited by examiner

*Primary Examiner* — Michael S McNally
(74) *Attorney, Agent, or Firm* — Shumaker & Sieffert, P.A.

(57) ABSTRACT

A system receives a request associated with a first account to delegate, to a second account, authority to send documents on behalf of the first account. The request identifies requirements that must be satisfied before the second account can send documents on behalf of the first account. Responsive to receiving a request to send a first document to a first entity from the second account and on behalf of the second account, the system sends the first document to the first entity. Responsive to receiving a request to send a second document to a second entity from the second account and on behalf of the first account, the system determines whether the request to send the second document satisfies the requirements. Responsive to the request satisfying the requirements, the system sends the second document to the second entity on behalf of the first account.

20 Claims, 3 Drawing Sheets

DELEGATED DOCUMENT SENDING AND MANAGEMENT

BACKGROUND

A document management system can enable sending entities to send documents to receiving entities. The sending entities may send the documents with tasks for the receiving entities to complete (e.g., signing a document, providing data to input fields embedded in a document) or send the documents such that the receiving entities may start internal processes involving the received documents. The document management system simplifies the process of distributing the documents and monitoring statuses of the documents for the sending entities by allowing the sending entities to delegate authority for sending (or otherwise managing or editing) the documents to another entity. However, in current systems, such delegation of authority prevents the other entity from sending otherwise managing documents on its own behalf or on behalf of any other entity, limiting the capabilities of the other entity that has been delegated with authority.

SUMMARY

The following disclosure describes document management system that enables users to define who may send and manage envelopes on their behalf. In particular, the document management system includes electronic signature functionality that enables users to sign documents in envelopes. The document management system includes permissions and controls that enable users to allocate control of envelopes to other users via the document management system. A second user who is allocated control of a first user's envelope may be able to send and manage the envelope on the first user's behalf, such that, to a recipient of the envelope, the envelope would appear to have been sent by the first user. The second user may only have control of particular envelopes designated by the first user and the second user's control may be limited based on a set of conditions indicated by the first user via the document management system.

In some embodiments, the document management system receives a request associated with a first account to delegate authority to a second account to send sets of documents stored via the document management system. The request identifies one or more sets of requirements that must be satisfied before the second account can send sets of documents on behalf of the first account. In response to receiving a request to send a first set of documents to a first entity form the second account and on behalf of the second account, the document management system sends the set of documents to the first entity. In response to receiving, by the document management system, a request to send a second set of documents to a second entity from the second account and on behalf of the first account, the document management system determines whether the request to send the set of documents satisfies the one or more set of requirements, in response to the request not satisfying the one or more sets of requirements, prevents the second account from sending the second set of documents on behalf of the first account, and in response to the request satisfying the one or more sets of requirements, sends the second set of documents to the second entity on behalf of the first account.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
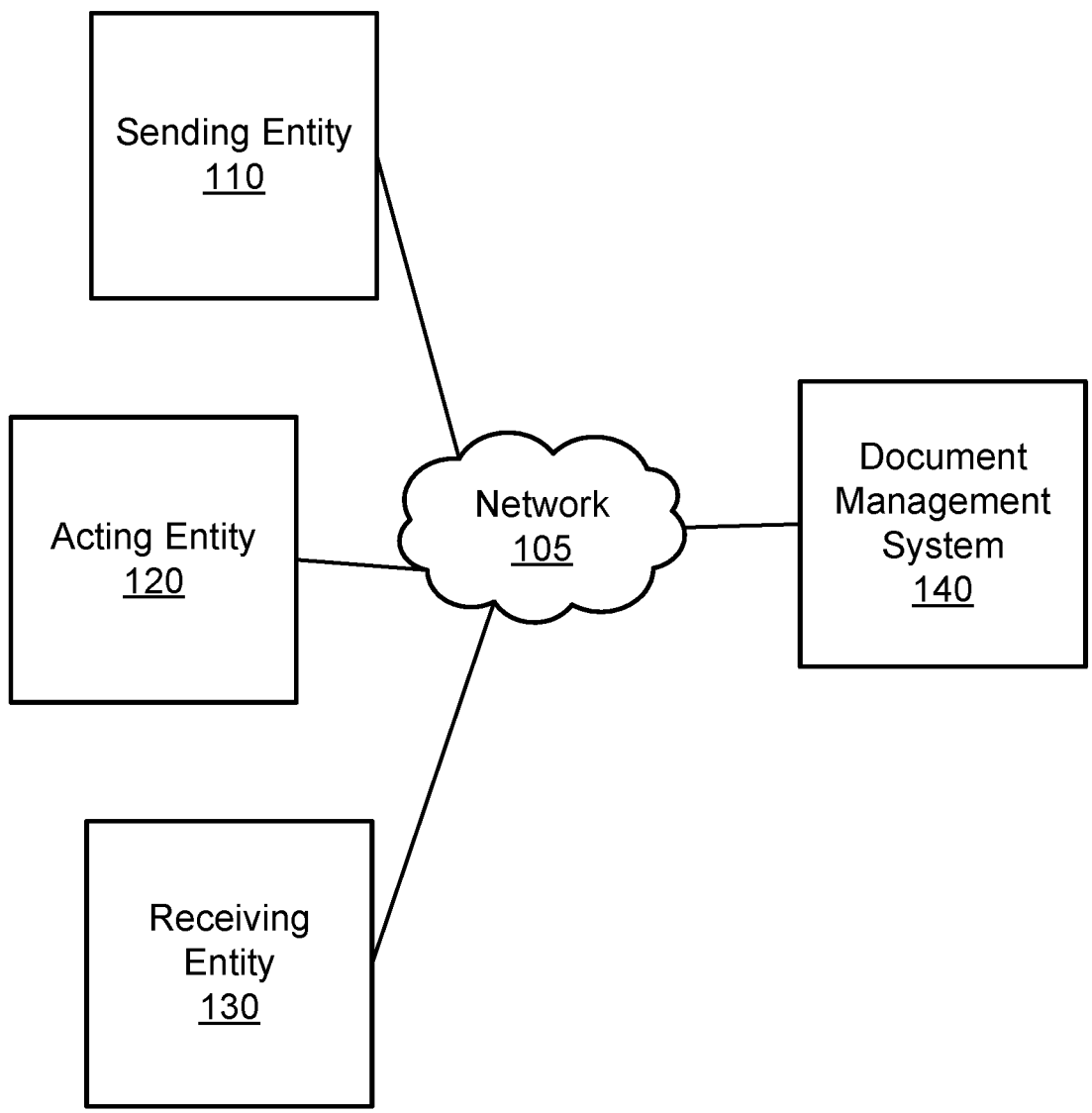
FIG. 1 is a block diagram of a system environment in which a document management system operates, in accordance with an embodiment.

FIG. 1 is a block diagram of a system environment 100 in which the document management system 140 operates. The system environment 100 shown by FIG. 1 includes the document management system 140, a sending entity 110, an acting entity 120, and a receiving entity 130. The system environment 100 may have alternative configurations than shown in FIG. 1, including for example different, fewer, or additional components. For example, an additional sending entity 110, acting entity 120, or receiving entity 130 may be communicatively coupled with the network 105 to the document management system 140. As another example, the document management system 140 may be communicatively coupled with a remote database storing data for the entities serviced (e.g., storing documents or entity profile information). As referred to herein, a "document" is an electronic document such as an invoice, contract, sales order, or agreement sent through a communications network (e.g., the network 105).

The system environment 100 described herein can be implemented within the document management system 140, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, document creation and management systems, collaborative document and workspace systems, online workflow management systems, multi-party communication and interaction platforms, social networking systems, marketplace and financial transaction management systems, or any suitable digital transaction management platform.

The network 105 may serve to communicatively couple the sending entity 110, the acting entity 120, the receiving entity 130, and the document management system 140. In some embodiments, the network 105 includes any combination of local area and/or wide area networks, using wired and/or wireless communication systems. The network 105 may use standard communications technologies and/or protocols. For example, the network 105 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 105 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 105 may be encrypted using any suitable technique or techniques.

The sending entity 110 is an entity using the document management system 140 to communicate documents to or coordinate document activity with other entities (e.g., acting entity 120, receiving entity 130). The sending entity 110 may be an individual, an organization, a company, an account, an administrator, and the like. The sending entity 110 may be the creator of the documents and/or who has authority to administer the documents by changing contents of the documents, grant or deny rights to access the document, place restrictions on, select tasks to be performed for the acting entity 120 or receiving entity 130 to complete, send the documents to another entity, or delegate authority to another entity.

The sending entity 110 sends a set of documents to the acting entity 120 by making a request to the document management system 140. The acting entity 120 may be an individual, an organization, a company, an account, an administrator, or another type of entity selected by the sending entity 110 to receive the set of documents and complete one or more tasks by performing actions on the set of documents such as opening the set of documents, reviewing contents of the set of documents, editing the contents of one or more documents, signing one or more documents, forwarding one or more documents to another user, performing identity verification, providing attachments, completing input fields of one or more documents, provide payments, or other interactions with one or more documents. The tasks may be specified by the sending entity 110 by configuring fields to be completed by the acting entity 120 within the set of documents. For example, the sending entity 110 may add signature blocks, input fields for textual input, and input fields for receiving attachments (e.g., images, spreadsheets, documents) in a document to be filled in by the acting entity 120. In some embodiments, the acting entity 120 may be delegated authority by the sending entity 110 to send documents on behalf of the sending entity 110 based on fulfillment of a set of requirements.

The sending entity 110 may receive push notifications from the document management system 140 regarding the statuses of the set of documents as the acting entity 120 performs actions on the set of documents or regarding events that prevent the acting entity 120 from completing the assigned tasks. The sending entity 110 may be associated with a webhook listener that listens for incoming notifications sent by the document management system 140. For example, the notifications may indicate whether the set of documents has been sent to the acting entity 120, whether the set of documents has been delivered to the acting entity 120, whether the set of documents has been signed or completed, whether the acting entity 120 has declined the set of documents, whether the acting entity 120 has failed to authenticate, whether the acting entity 120 has sent documents on behalf of the sending entity 110, or other relevant events regarding the set of documents sent out by the sending entity 110.

The sending entity 110 may also send a request to the document management system 140 to send a subset of the documents to the receiving entity 130 after the acting entity 120 has completed the tasks. Like the sending entity 110 and the acting entity 120, the receiving entity 130 may be an individual, an organization, a company, an account, an administrator, or the like. The receiving entity 130 may be assigned to one or more tasks (e.g., review and sign documents) associated with the subset of documents by the sending entity 110 or may be a "cc recipient" that receives a copy of the subset of documents but does not have any tasks to perform. As used herein, the term "receiving entity" refers to an entity that receives one or more documents from the sending entity 110 through the document system 140 and subscribed to receive push notifications associated with the one or more documents from the document management system 140. The receiving entity 130 may be associated with a webhook listener that listens for incoming notifications sent by the document management system 140. In contrast, the acting entity 120 may receive one or more documents but not push notifications from the document management system 140.

In some embodiments, the receiving entity 130 may receive a large volume of documents from different sending entities 110 through the document management system 140. A common method for the receiving entity 130 to monitor inbound documents from the document management system 140 is to make API calls to the document management system 140 and detect changes in the status of the inbound documents. However, for a large volume of documents, this is not a scalable method for keeping track of the documents. Instead, the receiving entity 130 may subscribe to a webhook service provided by the document management system 140, and the document management system 140 may generate and transmit push notifications regarding the receiving entity's 130 inbound documents to the receiving entity's webhook listener. Based on the received notifications, the receiving entity 130 may kick off processes for the inbound documents (e.g., archive, quality control check, place order), which improves efficiency of workflows.

As described above, the sending entity 110 may send a set of documents to the acting entity 120 and send a subset of the documents to the receiving entity 130. That is, the receiving entity 130 may not have access to one or more documents in the set of documents that were sent to the acting entity 120. To prevent the receiving entity 130 from receiving data associated with the one or more documents that the receiving entity 130 does not have access to, the sending entity 110 may also provide a recipient notification definition to define conditions for generating notification definition for the receiving entity 130. The recipient notification definition may identify the receiving entity 130 to receive the subset of the set of documents in the request, one or more event criteria associated with the subset of documents to trigger a notification for the receiving entity 130, and types of data associated with the subset of documents to provide to the receiving entity 130 in the notification. The recipient notification definition allows the sending entity 110 to not only control the subset of documents that are send to the receiving entity 130 but also notifications sent by the document management system 140 regarding the subset of documents to improve data security.

As referred to herein, communication with an entity (e.g., sending entity 110, acting entity 120, receiving entity 130) involves communication with a computing device of the entity, where the computing device is capable of receiving user input as well as transmitting and/or receiving data via the network 105. In some embodiments, the computing device of an entity (e.g., sending entity 110, acting entity 120, receiving entity 130) is a conventional computer system, such as a desktop or a laptop computer. Alternatively, the computing device may be a device having computer functionality, such as a personal digital assistant (PDA), a mobile telephone, a smartphone, or another suitable device.

The computing device is configured to communicate with the document management system 140 via the network 105, for example using a native application executed by the computing device and provides functionality of the document management system 140, or through an application programming interface (API) running on a native operating system of the computing device, such as IOS® or ANDROID™.

In one embodiment, the sending entity 110 is an attorney, the acting entity 120 is the lawyer's assistant, and the receiving entity 130 is the lawyer's client. The attorney may delegate authority to their assistant to send documents for signature to the client on their behalf. The assistant may be able to edit the documents before sending to the client, and to the client, the documents may appear to be sent directly from the attorney. The attorney and the assistant may each receive notifications when the documents have been signed. Though the assistant may be able to see those documents, the attorney may designate authority to another assistant for a different set of documents, such that the other assistant can manage the documents. In such an instance, the attorney's assistant may not be able to see the documents if not designated the authority by the attorney. Details on generating and sending recipient notification are provided in the description of FIGS. 2-3.

In one embodiment, the document management system 115 receives a request from the sending entity 110 to delegate authority to the acting entity 120 to send documents on behalf of the sending entity 110. The request may be associated with a set of requirements that must be satisfied for the acting entity 120 to use their authority. For example, the requirements may indicate that the acting entity 120 may only manage or send documents related to certain other entities or accounts, during certain time periods, of certain types, and the like. The sending entity 110 may delegate authority to a variety of other entities or accounts for the same or different documents.

Document Management System

Figure 2:
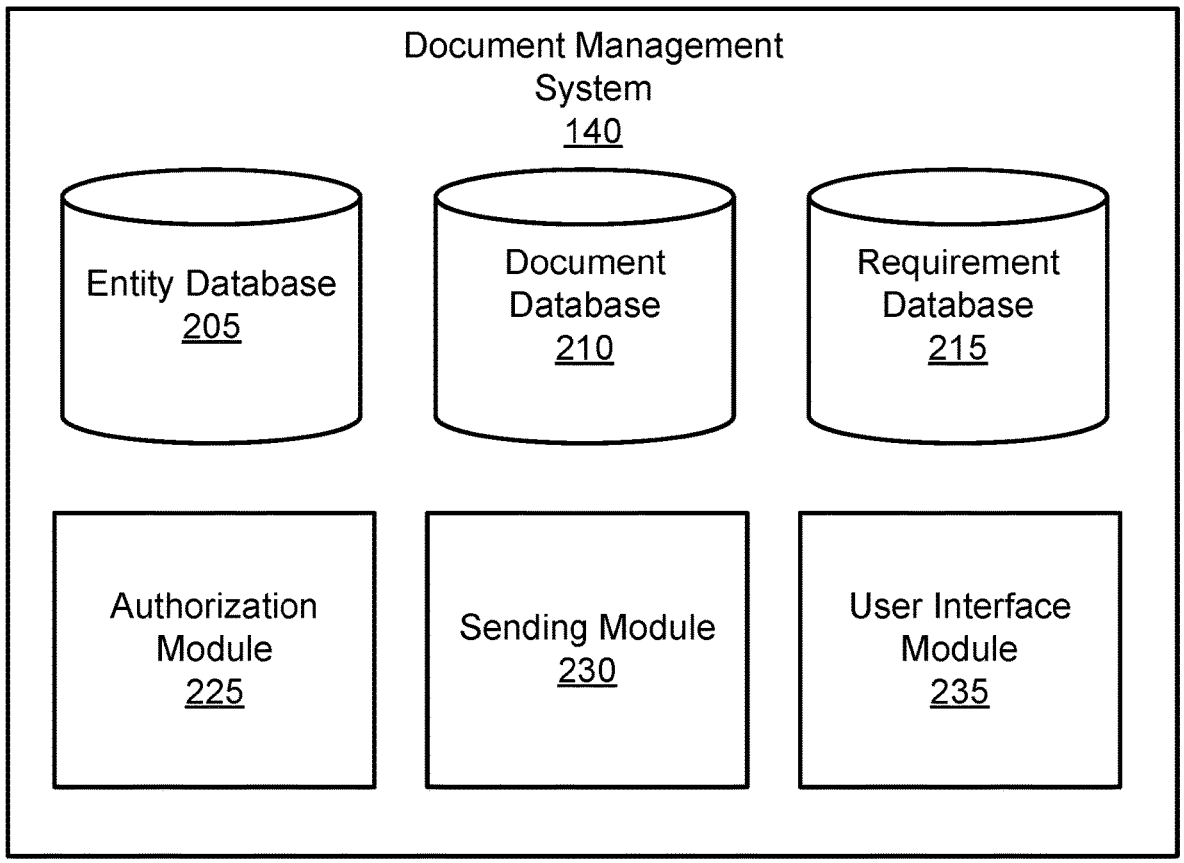
FIG. 2 is a block diagram of the document management system, in accordance with an embodiment.

FIG. 2 is a block diagram of the document management system 140, in accordance with an embodiment. The document management system 140 includes an entity database 205, document database 210, requirement database 215, authorization module 225, sending module 230, and user interface module 235. The modules and databases illustrated in FIG. 2 are merely exemplary, and other embodiments of the document management system 140 may include additional, fewer, and/or different components. For example, at least one of the entity database 205, document database 210, requirement database 215 may be stored remotely and may be accessible through the network 105.

The entity database 205 stores entity information associated with entities (e.g., sending entity 110, acting entity 120, receiving entity 130) connected to the document management system 115. Each entity may be associated with one or more accounts related to the entity. For example, in some embodiments, an entity is a real estate office associated with an account for each realtor that works in the real estate office. The entity information for an entity includes characteristics and activity history of the associated account and entity. As referred to herein, "characteristic information" represents characteristics of the entity that is not directly related to the document management system 115, and "activity history" represents activities performed by the entity within the document management system 115. Characteristic information may include information about the entity, such as type of industry associated with the entity (e.g., financial, technology, healthcare), number and identity of accounts associated with the entity (e.g., accounts of employees of the entity with accounts), type and number of entities with which the entity has interacted in the past, types of documents that the entity has sent or received in the past, applications used by the entity to access documents, geographic location of the entity, security measures associated with the entity, internet protocol (IP) addresses used by computing devices of the entity, hardware attributes of computing devices of the entity, or any other suitable characteristics of an entity that is not directly related to the document management system 115. Characteristic information may also include information about each account associated with the entity, such as login information, personal information, account identifier, associated documents, delegated authorities, and the like. Activity history may include data associated with activities previously performed by the entity via an account, such as type of action performed, date and time at which actions were performed, identities of documents on which the actions were performed, or other suitable data regarding previous activities performed.

The document database 210 stores documents that are sent or received by entities connected to the document management system 115. A document may include text data, image data, spreadsheet data, or any other type of data. In some embodiments, the document database 210 may store a plurality of documents sent in the same request as a set (also referred to herein as "an envelope"). An envelope may include information about the security and/or authentication requirements, signing requirements, collection requirements, network(s) through which the envelope is being sent, and the like. The requirements may be associated with the envelope generally, or may be specific to particular documents within the envelope. For example, each document in the envelope may have unique signing requirements based on the content of the document, and the envelope may be associated with a set of collection requirements based on the aggregate collection requirements of each document within the envelope. That is, one group of acting entities 120 and/or receiving entities 130 may be required to sign a first document, and a different group of acting entities 120 and/or receiving entities may be required to sign a second document different from the first document. A document may be modified by the sending entity 110 to include fields to be completed by the acting entity 120 and/or the receiving entity 130. Each envelope may also include one or more tags that identify which acting entities 120 and/or receiving entities 130 are responsible for execution of each document.

The document database 210 may also store metadata associated with a document such as document type, content of the document (e.g., certain keywords within the document), types of tasks associated with the document, creator of the document, access privileges, date of creation, file size, date of transmission, date of request completion, place of creation, template associated with document, tags and categories, file name, and any other aspect of the document.

The requirement database 215 stores requirements indicated for accounts with delegated authority to manage and send documents and envelopes. The requirements may include designated time periods, type of document(s), particular documents, price range, type of action being requested from the receiving entity 130 of documents/envelopes, particular receiving entities 130, and the like. Each account for an entity may be associated with one or more sets of requirements related to a sending account or sending entity 110 that designated authority to the account. The requirements may be specified via sending entity 110 and are received by the user interface module 235 before being stored in the requirement database.

The authorization module 225 receives requests for delegating authority from the user interface module 235. A request may include an account identifier of the account delegating the authority (henceforth referred to as the delegator account), an account identifier of the account that is being delegated the authority (henceforth referred to as the authorized account), one or more types of authority, and one or more sets of requirements that must be satisfied for the account being delegated with authority to use the authority. The types of authority may include sending authority (e.g., the delegator account is allowing the authorized account to send documents on its behalf), managing authority (e.g., the delegator account is allowing the authorized account to manage and edit documents on its behalf), and viewing authority (e.g., the delegator account may access the documents for viewing). When an authorized account sends documents on behalf of a delegator account, an account receiving the documents (henceforth referred to as a receiver account) will see the documents as being sent from the delegator account, not the authorized account. When an authorized account manages or edits documents on behalf of a delegator account, the documents may be stored as managed or edited in the document database 210 with an indicator that the delegator account was associated with the management or edits. In some embodiments, the documents may also be stored with an indicator that the authorized account was associated with the management or edits.

For each request to delegate authority, the authorization module 225 stores the sets of requirements in association with the entity information for the authorized account, along with an account identifier of the delegator account and the type of authority, in the requirement database 215. In some embodiments, each set of requirements may include one or more types of documents or particular documents that the authorized account has the type of authority to send, manage, or edit. For example, Josh may designate Vivian with sending authority for a rental contract with the requirement that she sends the rental contract between Monday evening and Tuesday at noon. Josh may also designate Penelope with managing authority on the rental contract with the requirements that she edits the rental contract before Vivian sends the rental contract to Winston and does not change the title of the rental contract. Vivian and Penelope may not be able to access any other documents of Josh's, unless he has designated authority to them to do so.

The authorization may receive a number of requests from a first account to delegate one or more types of authority to any number of other accounts. The other accounts may be part of the same entity as the first account or, in some embodiments, may be related to other entities. In some embodiments, the first account may delegate authority to any number of other accounts for the same document(s). In other embodiments, the first account may only delegate each type of authority to one other account for a given document or envelope. Accounts that have been delegated authority by the first account may still maintain authority over the account's own documents. For instance, a second account delegated sending authority by the first account over a template may send the template on behalf of the first account, and the first account may maintain authority to send the document on its own behalf if desired. The second account may additionally send, manage, edit, and view other documents on its own behalf. Thus, the second account has limited authority over the template as designated by the first account but still retains full authority over its own documents. The second account may have additional authorities granted by the first account or other accounts over additional documents that does not impact its own authority over its own documents or authorities granted to the second account by other accounts.

The sending module 230 may also receive requests for taking action with respect to documents from the user interface module 235. The request may include an account identifier of an authorized account, one or more documents, and one or more types of actions (e.g., to send, edit, manage, or view the one or more documents). The sending module 230 may take the one or more types of actions and update the document database 210 to reflect the types of actions. For example, Penelope may request to send Winston a contract for licensing a kitchen, and the sending module 230 may send the contract to Winston. In some embodiments, the request includes using authority to take action with respect to documents. If the authorized account has sending authority, the request may include a receiver account for the one or more documents to be sent to. If the authorized account has managing authority, the request may include one or more desired edits to the one or more documents and/or one or more management changes (e.g., indications of where to store the one or more documents, metadata to associate with the one or more documents, etc.) for the one or more documents.

The sending module 230 accesses requirements for the type of authority of the authorized account from the entity database 205. The sending module 230 assesses each of the requirements to determine if the requirements have been met. For example, the sending module 230 may compare a current time with a designated time period, a type of each of the one or more documents with a designated type(s) of document, the type of action being requested, a type of entity of a receiver account, and the like. If the sending module 230 determines that one or more of the requirements have not been met for the request, the sending module 230 prevents the type of action from being taken and sends an indication to the user interface module 235 of which requirement(s) has not been met. If the sending module 230 determines that the requirements have been met, the sending module 230 performs the one or more types of actions of the request. For instance, if the request specifies managing the storage location of a document or an edit to the document, the sending module 230 updates the document or associated metadata in the document database 210. In another example, if the request specifies to send a document to one or more receiver accounts, the sending module 230 may access the document from the document database 210 and send the document to the one or more receiver accounts (e.g., by associating the document in the document database 210 with the one or more receiver accounts or by transmitting the document via the network 105). The sending module 230 may also send an indication to the user interface module 235 that the types of actions of the request were performed.

For example, Penelope may be designated with sending authority from Winston for sending contracts worth less than $100,000 to any account associated with the entity Baker Boy Enterprises. The sending module 230 may receive a request from Penelope to send a contract for advertising Baker Boy Enterprises on a billboard in Fremont to Donnae. The sending module 230 may determine that the contract is worth $50,000 and that Donnae has an account associated with the entity Baker Boy Enterprises. Since Penelope's request meets the requirements indicated by Winston when he designated her with sending authority, the sending module 230 may send the contract to Donnae on behalf of Winston. Thus, the document will appear to Donnae as having been sent form Winston, even though Penelope sent the document. Penelope may further send her own documents on her own behalf to Donnae, such that Donnae sees that the documents are sent from Penelope but may not be able to send a contract worth $200,000 to Donnae on behalf of Winston. Penelope may be able to manage additional documents for Winston if she meets the requirement of performing the management during business hours.

The user interface module 235 generates a graphical user interface that is presented to an entity. The graphical user interface may include graphical elements that allow an entity to access an account. Once an account has been indicated via the graphical user interface, the graphical user interface may include graphical elements that allow the entity to request to view documents, request to delegate authority to other accounts (including selecting one or more receiver accounts, indicating requirements, etc.), and request to use authority to take action with respect to documents (including which document(s), type of action, etc.). The user interface module 235 may access the requested documents from the document database 210 and send the requests to the authorization module 225 and sending module 230. The user interface module 235 may receive indications from the sending module 230 about whether the requirements for a request to use authority were met. The user interface module 235 may modify the graphical user interface to display the indications and include graphical elements that allow the entity to take a different action or access other part of the document management system 140.

Figure 3:
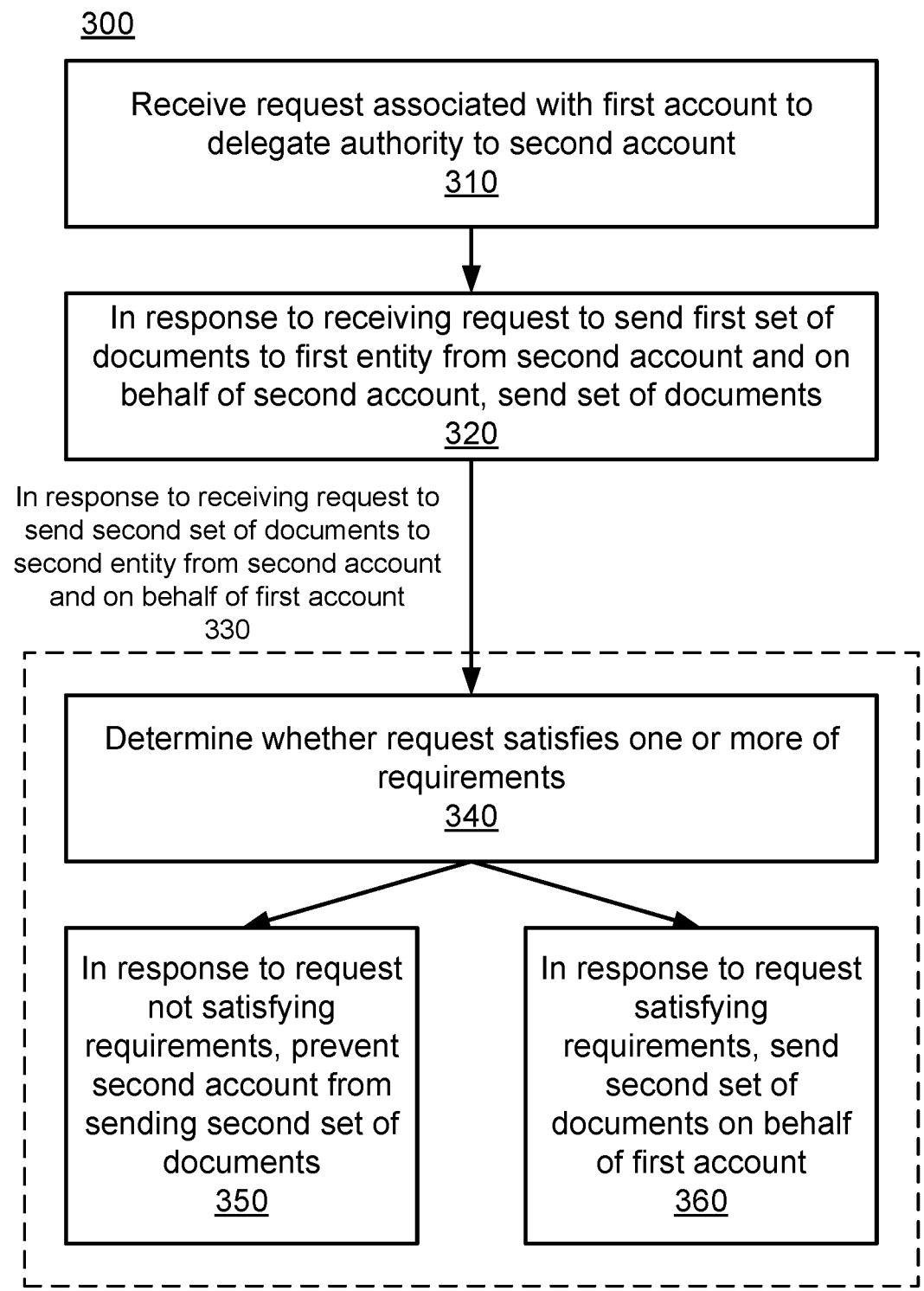
FIG. 3 is a flowchart illustrating a process for sending documents based on a request, in accordance with an embodiment.

FIG. 3 is a flowchart illustrating a process 300 for sending documents based on a request, in accordance with an embodiment. Though reference is made to module of the document management system 140 for this process, the process 300 can be used by other online systems or mobile applications in some embodiments.

The user interface module 235 receives 310 a request associated with a first account to delegate, to a second account, authority to send sets of documents stored by the document management system on behalf of the first account. The request identifies one or more sets of requirements that must be satisfied before the second account can send sets of documents on behalf of the first account. The requirements may include a designated time period, a type of document, and a price range. The authority authorizes the second account to have access sets of documents associated with the first account, and the second account may have additional authority to send sets of documents stored in the document database 210 on its own behalf. The user interface module 235 sends the request to the authorization module 225, which stores a type of the authority and the requirements in the requirement database 215. In response to receiving a request to send a first set of documents to a first entity from the second account and on behalf of the second account, the sending module 230 sends 320 the first set of documents to the first entity.

In response to receiving 330 a request to send a second set of documents to a second entity from the second account and on behalf of the first account, the sending module 230 determines 340 whether the request to send the second set of documents satisfies the one or more set of requirements associated with the authority of the second account from the requirement database 215. In response to the request not satisfying the one or more sets of requirements, the sending module 230 prevents 350 the second account from sending the second set of documents on behalf of the first account. The user interface module 235 may receive an indication from the sending module 230 that the second set of documents were prevented from being sent and display an indication to an entity of the second account of the prevention via a graphical user interface. In response to the request satisfying the one or more sets of requirements, the sending module 230 sends 360 the second set of documents to the second entity on behalf of the first account. The user interface module 235 may receive an indication from the sending module 230 that the documents were sent and display the second set of documents to the second entity via a graphical user interface. The second set of documents may appear to the second entity to be sent from the second account.

It is appreciated that although FIG. 3 illustrates a number of interactions according to one embodiment, the precise interactions and/or order of interactions may vary in different embodiments. For example, in some embodiments, the sending module 230 may receive from the second entity, an electronic signature for one or more of the second set of documents and store the electronic signature in association with the one or more of the second set of documents at the document database 210. In another embodiment, in response to receiving a request to send a third set of documents to the second entity from the second account on its own behalf, the sending module 230 sends the third set of documents to the second entity.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by a document management system, a request associated with a first account to delegate, to a second account, authority to send sets of documents stored by the document management system on behalf of the first account, the request identifying one or more sets of requirements that must be satisfied before the second account can send sets of documents on behalf of the first account;
   in response to receiving, by the document management system, a request to send a first set of documents to a first entity from the second account and on behalf of the second account, sending the first set of documents to the first entity;
   in response to receiving, by the document management system, a request to send a second set of documents to a second entity from the second account and on behalf of the first account:
      determining whether the request to send the second set of documents satisfies the one or more set of requirements;
      in response to the request not satisfying the one or more sets of requirements, preventing, by the document management system, the second account from sending the second set of documents on behalf of the first account; and
      in response to the request satisfying the one or more sets of requirements, sending, by the document management system, the second set of documents to the second entity on behalf of the first account.

2. The method of claim 1, wherein the second account has authority to send sets of documents stored by the document management system on its own behalf.

3. The method of claim 1, wherein the one or more set of requirements include one or more of: a designated time period, a type of document, and a price range.

4. The method of claim 1, wherein the authority authorizes the second account to have access sets of documents associated with the first account.

5. The method of claim 1, further comprising:
   receiving, from the second entity, an electronic signature for one or more of the second set of documents; and
   storing the electronic signature in association with the one or more of the second set of documents at the document management system.

6. The method of claim 1, further comprising:
   in response to receiving, by the document management system, a request to send a third set of documents to the second entity from the second account on its own behalf, sending the third set of documents to the second entity.

7. The method of claim 1, wherein the second set of documents sent to the second entity appear to be sent from the second account.

8. A non-transitory computer-readable storage medium containing computer program code that, when executed by a processor, causes the processor to perform steps comprising:
   receiving, by a document management system, a request associated with a first account to delegate, to a second account, authority to send sets of documents stored by the document management system on behalf of the first account, the request identifying one or more sets of requirements that must be satisfied before the second account can send sets of documents on behalf of the first account;
   in response to receiving, by the document management system, a request to send a first set of documents to a first entity from the second account and on behalf of the second account, sending the first set of documents to the first entity;
   in response to receiving, by the document management system, a request to send a second set of documents to a second entity from the second account and on behalf of the first account:
      determining whether the request to send the second set of documents satisfies the one or more set of requirements;
      in response to the request not satisfying the one or more sets of requirements, preventing, by the document management system, the second account from sending the second set of documents on behalf of the first account; and
      in response to the request satisfying the one or more sets of requirements, sending, by the document management system, the second set of documents to the second entity on behalf of the first account.

9. The non-transitory computer-readable storage medium of claim 8, wherein the second account has authority to send sets of documents stored by the document management system on its own behalf.

10. The non-transitory computer-readable storage medium of claim 8, wherein the one or more set of requirements include one or more of: a designated time period, a type of document, and a price range.

11. The non-transitory computer-readable storage medium of claim 8, wherein the authority authorizes the second account to have access sets of documents associated with the first account.

12. The non-transitory computer-readable storage medium of claim 8, wherein the computer program code further causes the processor to perform steps comprising:
   receiving, from the second entity, an electronic signature for one or more of the second set of documents; and
   storing the electronic signature in association with the one or more of the second set of documents at the document management system.

13. The non-transitory computer-readable storage medium of claim 8, wherein the computer program code further causes the processor to perform steps comprising:
   in response to receiving, by the document management system, a request to send a third set of documents to the second entity from the second account on its own behalf, sending the third set of documents to the second entity.

14. The non-transitory computer-readable storage medium of claim 8, wherein the second set of documents sent to the second entity appear to be sent from the second account.

15. A system comprising:
a processor; and
a non-transitory computer-readable storage medium containing computer program code that, when executed by a processor, causes the processor to perform steps comprising:
receiving, by a document management system, a request associated with a first account to delegate, to a second account, authority to send sets of documents stored by the document management system on behalf of the first account, the request identifying one or more sets of requirements that must be satisfied before the second account can send sets of documents on behalf of the first account;
in response to receiving, by the document management system, a request to send a first set of documents to a first entity from the second account and on behalf of the second account, sending the first set of documents to the first entity;
in response to receiving, by the document management system, a request to send a second set of documents to a second entity from the second account and on behalf of the first account:
determining whether the request to send the second set of documents satisfies the one or more set of requirements;
in response to the request not satisfying the one or more sets of requirements, preventing, by the document management system, the second account from sending the second set of documents on behalf of the first account; and
in response to the request satisfying the one or more sets of requirements, sending, by the document management system, the second set of documents to the second entity on behalf of the first account.

16. The system of claim 15, wherein the second account has authority to send sets of documents stored by the document management system on its own behalf.

17. The system of claim 15, wherein the one or more set of requirements include one or more of: a designated time period, a type of document, and a price range.

18. The system of claim 15, wherein the authority authorizes the second account to have access sets of documents associated with the first account.

19. The system of claim 15, wherein the computer program code further causes the processor to perform steps comprising:
receiving, from the second entity, an electronic signature for one or more of the second set of documents; and
storing the electronic signature in association with the one or more of the second set of documents at the document management system.

20. The system of claim 15, wherein the computer program code further causes the processor to perform steps comprising:
in response to receiving, by the document management system, a request to send a third set of documents to the second entity from the second account on its own behalf, sending the third set of documents to the second entity.

* * * * *